(12) United States Patent
Lu et al.

(10) Patent No.: US 6,439,057 B1
(45) Date of Patent: Aug. 27, 2002

(54) PRESSURE MONITOR USED WITHIN THE CAVITY TO BE MONITORED

(76) Inventors: Ming Che Lu, No.8, Lane 64, Lien-fu St., Chin-hsin Tsun, Lu-chu Hsiang; Kuen Tai Liu, 8-3 F, No.2, Alley 7, Lane 190, Sec.1, Wen-hua-I Rd., Lin-kou Hsiang, Taipei Hsien, both of (TW)

( * ) Notice: Subject to any disclaimer, the term of this patent is extended or adjusted under 35 U.S.C. 154(b) by 59 days.

(21) Appl. No.: 09/670,767

(22) Filed: Sep. 27, 2000

(51) Int. Cl.[7] .................................................. G01L 7/08
(52) U.S. Cl. ......................................................... 73/715
(58) Field of Search .......................... 73/706, 715–727, 73/702, 426

(56) References Cited

U.S. PATENT DOCUMENTS 6,016,704 A * 1/2000 Hobelsberger ............... 73/720

* cited by examiner

*Primary Examiner*—William Oen
(74) *Attorney, Agent, or Firm*—Merchant & Gould P.C.

(57) ABSTRACT

A pressure sensor in a pressure container is introduced to detect pressure difference by comparing an unknown internal pressure with a predetermined pressure of an air-tight chamber. Upon the existence of the pressure difference, a signal to show whether the inside pressure is higher or lower than the predetermined one can be provided for taking further relative measures. The pressure sensor is characterized on that: an air chamber is located at the bottom of the pressure sensor for providing thereinside an air-tight chamber, a press button provided on top of the air-tight chamber is contacted thereabove with a pressure membrane and therebelow with a spring, the pressure membrane is supported by an air-tight cushion at the bottom thereof and further connected with a protrusion of the shaft at the top thereof, the shaft is facilitated with electric conductive points both inside and outside which connect further with electrodes of a base plates, and an air hole of the base plate is included to introduce the interior pressure of the container for pressure comparison with the predetermined pressure.

1 Claim, 6 Drawing Sheets

PRESSURE MONITOR USED WITHIN THE CAVITY TO BE MONITORED

BACKGROUND OF THE INVENTION

(1) Field of the Invention

This invention relates to a pressure sensor used inside a container. The present sensor firstly sets a predetermined pressure as a reference, not the atmospheric pressure, for providing information about any pressure change inside the container.

(2) Background of the Invention

The sensor mostly used now can measure a pressure or a pressure difference/signal to users for taking necessary steps only through comparing with the well-known standard pressure, i.e. the atmospheric pressure. The sensor applied in an air compressor is also one of this kind. Take the example of the air compressor for a painting gun (referring to FIG. 1). As talking about the painting gun, people will definitely think of paint spraying. For achieving a good spraying, the ratio of air to paint is a key point, and the quantity adjustment of the air for obtaining a substantial pressure level is another key point.

When the compressor (1) works, the pressure sensor (11) will be prepared separately and then be connected at one end thereof with the indicator (12) through a pipe. Moreover, another end of the pressure sensor (11) is remained opened to the ambience, by which the outside pressure can be obtained as a standard pressure to measure the pressure inside the air compressor. The indicator (12) will show the pressure or the pressure difference through an electric signal for the users to control the pressure of painting gun.

Aforesaid kind of pressure sensor with a connection with the outward can measure an inside pressure by comparing with the standard pressure (around 1 unit of atmospheric pressure) and show it to the indicator. Because the standard of atmospheric pressure might vary with the weather, the measurement result will be fluctuated as well. Besides, there is a pipe on the sensor's open end to the outward, so that possible leakage may happen if the joint structure is not well sealed.

SUMMARY OF THE INVENTION

Accordingly, the inventor proposes the solution techniques and methods as follows.

The pressure sensor inside the container is actually a shell with protrudes respectively located thereof at a top end, a bottom end and a middle part for clipping a body of the sensor. There is an air chamber, formed between a bottom plate and an inside wall, for providing thereinside an airtight chamber with a spring located at the center of a base of the airtight chamber. The spring supports against and is covered by a button at the top, which then is covered by a pressure membrane. A round air-tight cushion is set on the bottom against the membrane. On the pressure membrane, another chamber is located, through which the pressure inside the container can be conducted. In the middle of the chamber, there locates a shaft with a movable protrudent shaft for contacting the pressure membrane. A plurality of electric conductive points is facilitated to both insides and outsides of the shaft for further linking with respective electrodes on the base plate fixed beyond the shaft. At least an air hole is used to penetrate the base plate and is connected to the air chamber.

In the present invention, the reference pressure for the pressure sensor is a fixed value. When the pressure inside the container is equal to the reference one, the pressure membrane and the protrudent shaft will not move. Upon that the electric conductive points on the shaft do not touch the protrudent shaft, the electrodes will not be conducted and no signal can be generated to the users. When the pressure inside the container is greater than the reference pressure, the pressure membrane as well as the protrudent shaft will move downward. Because the electric conductive points on the shaft are not touched by the protrudent shaft, so that the electrodes will not be conducted and no signal can be produced either. When the pressure inside the container is less than the reference pressure, the pressure membrane and the protrudent shaft will move upward. In this situation, the electric conductive points on the shaft will be touched by the protrudent shaft, so that the electrodes will be conducted for producing a signal to inform the users to take some necessary steps.

In the present invention, the pressure sensor in the close container is not air-communicated with the outward through any pipe, so that the reference pressure will not be affected by the atmospheric pressure. Therefore, the measurement result provided by the pressure sensor of the present invention can be relatively reliable.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a pressure sensor in a pressure container and a method for measuring the inner pressure of pressure container. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

The structure and functional characters will be described in detail in the following paragraphs through a preferred embodiment in accordance with the present invention and several accompanying figures.

Figure 1:
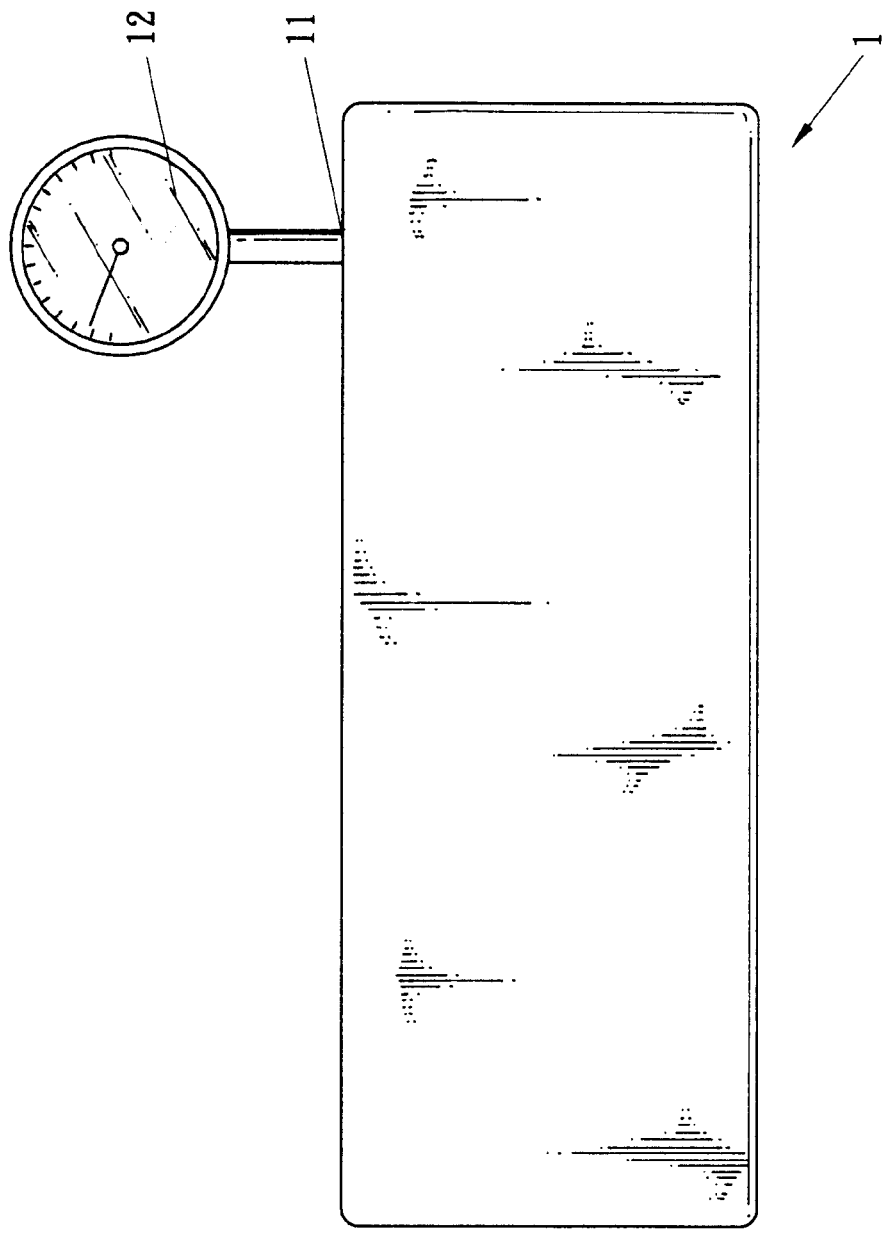
FIG. 1 is a view of the pressure sensor mostly used now.
Figure 2:
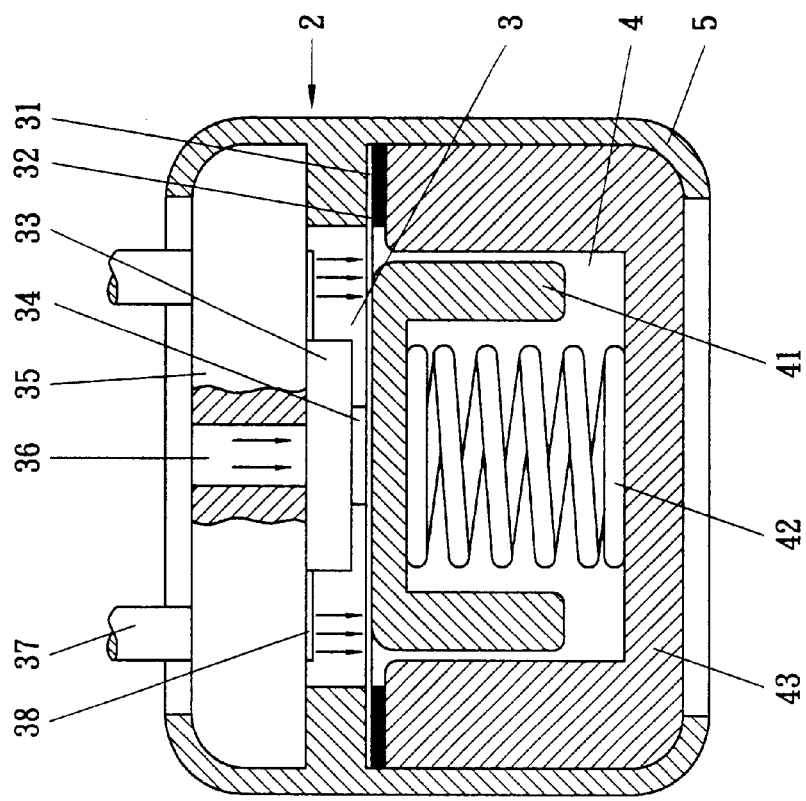
FIG. 2 is a view of the structure of the pressure sensor of the invention.

Referring now to FIG. 2, a pressure sensor (2) is divided by a pressure membrane (31); the upper portion is an inner pressure chamber (3), and the lower one is an air-tight chamber (4). Below the pressure membrane (31), an air-tight cushion (32) is included to isolate the air. Above the pressure membrane (31), a shaft (33) as shown is provided. The shaft (33) is fixed at the bottom thereof with a movable protrudent shaft (34) tightly adhered to the membrane (31), and on the top of the shaft (33) a base plate (35) is mounted to provide an air hole (36) for introducing the inside pressure for measurement. On both sides of the base plate, electrodes (37) are provided for connecting with the shaft (33) through respective electric conductive points (38). On the bottom of the pressure membrane (31), a button (41) is facilitated to cover a spring (42), and both of them (41) and (42) are mounted inside the air-tight chamber (4) for forming a part of the air-tight body (43). All the parts mentioned above are installed in the body shell (5).

Figure 3C:
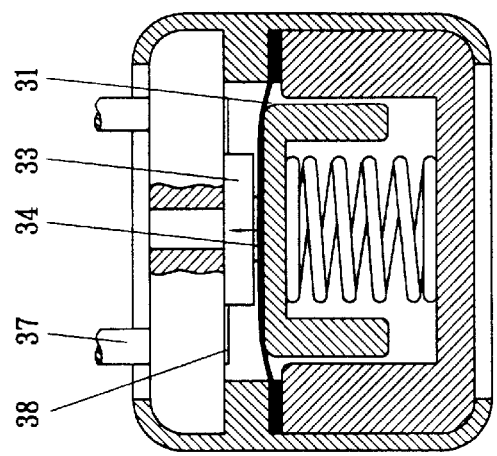
FIG. 3C is a view of the pressure sensor of the invention under the reference pressure greater than the inner pressure.
Figure 3B:
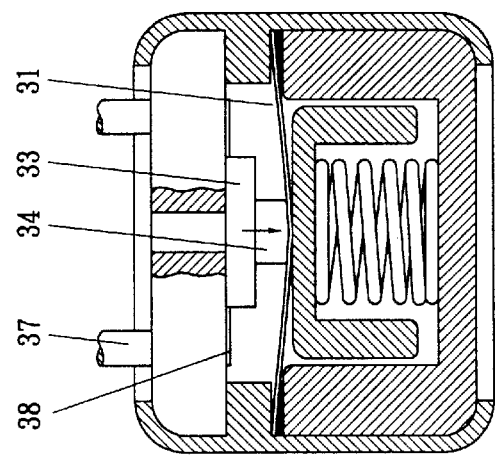
FIG. 3B is a view of the pressure sensor of the invention under the reference pressure less than the inner pressure.
Figure 3A:
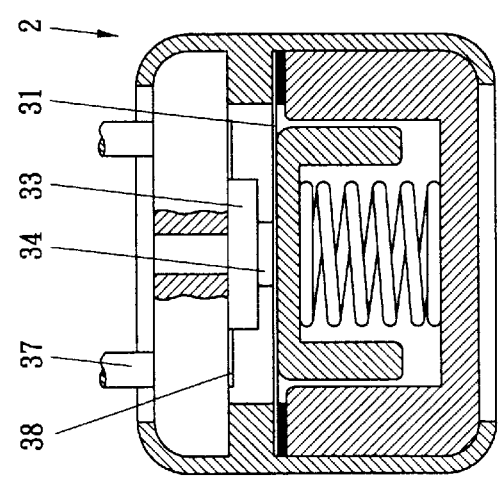
FIG. 3A is a view of the pressure sensor of the invention under the reference pressure equal to the inner pressure.

Refer now to FIGS. 3A, 3B and 3C. In the present invention, the reference pressure of the pressure sensor (2) is a fixed value. When the pressure inside the container is equal to the reference one, the pressure membrane (31) and the protrudent shaft (34) on the shaft (33) will not move. Due to the electric conductive points (38) on the shaft (33) not touched by the protrudent shaft (34), the electrodes (37) will thus not be conducted (FIG. 3A). When the pressure inside the container is greater than the reference pressure, the pressure membrane (31) and the protrudent shaft (34) on the shaft (31) will move downward. Because the electric conductive points (38) on the shaft (33) are not touched by the protrudent shaft (34), the electrodes (37) will not be conducted as well (FIG. 3B). When the pressure inside the container is less than the reference pressure, the pressure membrane (31) as well as the protrudent shaft (34) on the shaft (33) will move upward. As long as the electric conductive points (38) on the shaft (33) are touched by the protrudent shaft (34), the electrodes (37) will be conducted and sent out a signal of insufficient pressure (FIG. 3C).

Figure 4:
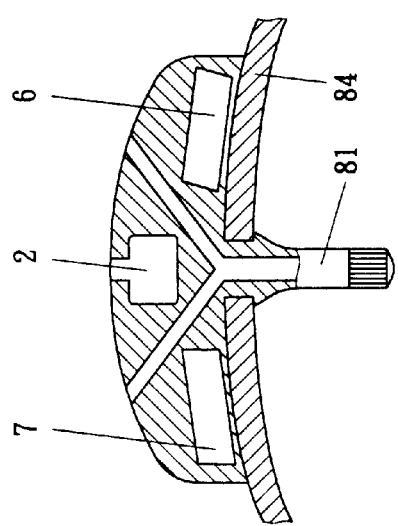
FIG. 4 is a view of the installation of the pressure sensor of the invention and other parts through the air mouth.

Refer now to FIG. 4. An example of automobile tires is used to explain the feasibility of the application of the present invention. When the invention is used to the pressure measurement of automobile tires (8), the pressure sensor (2) is combined with a battery (6) and a projector (7) and fixed on the steel rim (84) with an air mouth (81).

Figure 5:
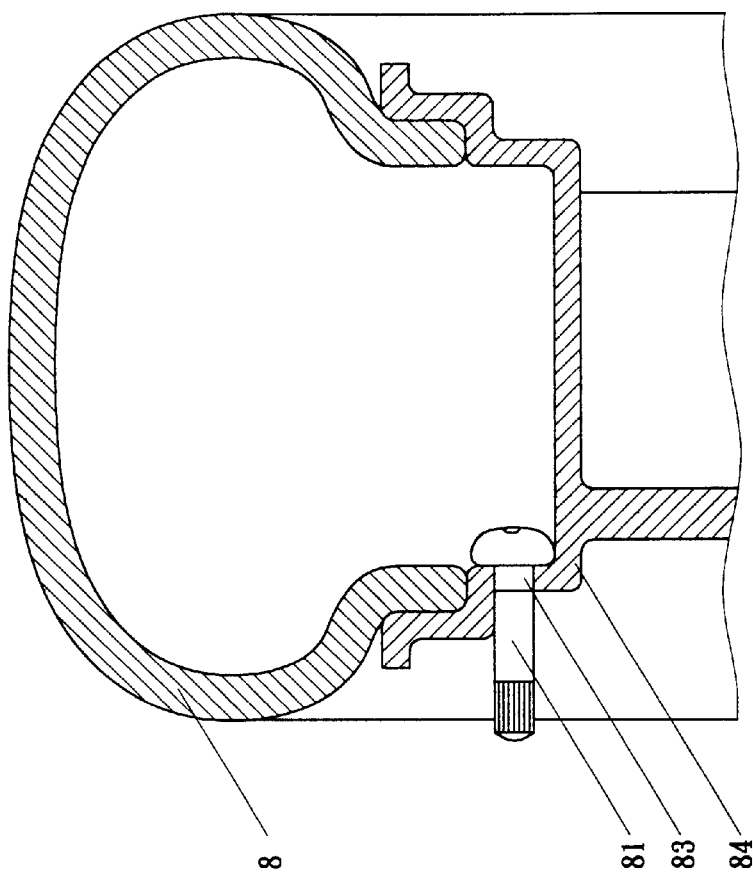
FIG. 5 is a view of the installation of the pressure sensor of the invention in the automobile tire.

Refer now to FIG. 5. In installation, remove the tire (8) and insert the air mouth (81) from one side the air hole (83) of the tires. Finally, the air mouth (81) will be clipped and fixed tightly on the steel rim (84).

Figure 6:
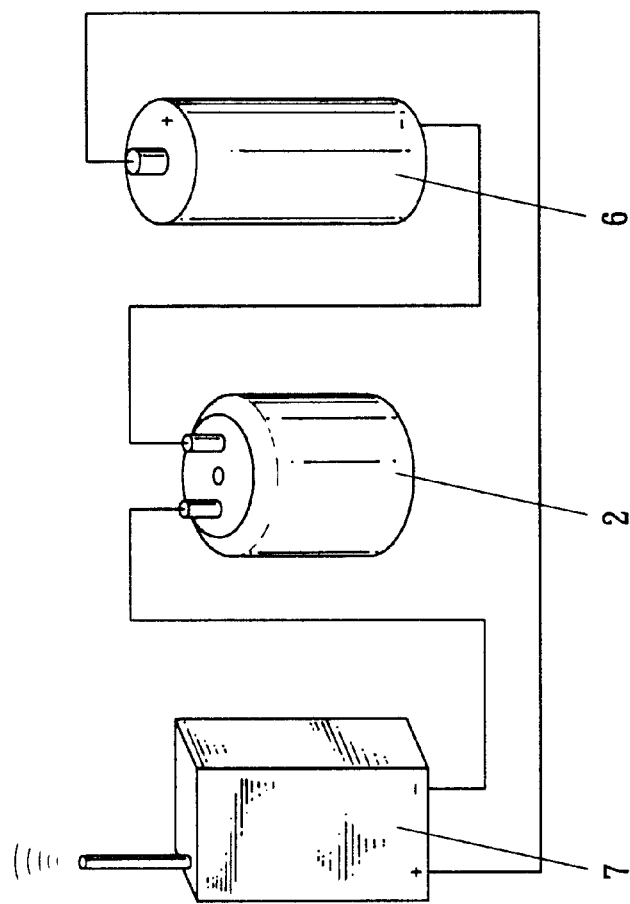
FIG. 6 is a view of the installation of the signal system in the pressure sensor of the invention.
Figure 6:
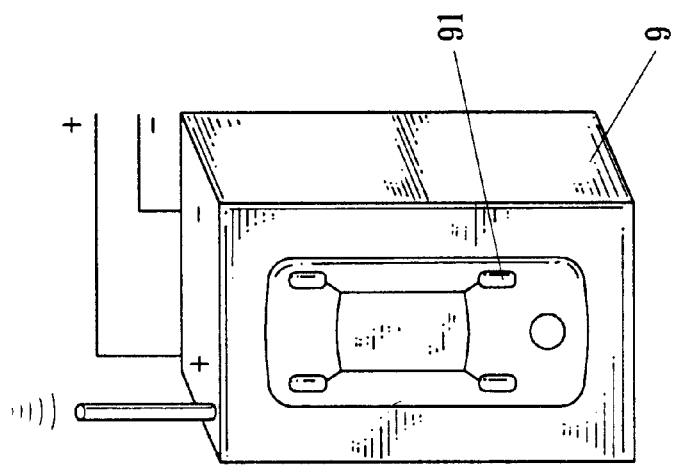

Refer now to FIG. 6. The pressure sensor (2) is put inside of the tire (8), thus the electric signal from the pressure sensor (2) linked with the battery (6) needs to be projected through the cordless projector (7). The pressure signal will be shown through the lights (91) of the receiver (9) with the lighter of the vehicle as the electric resources. Upon such an arrangement, the driver can be reminded in advance for further reaction.

Figure 7:
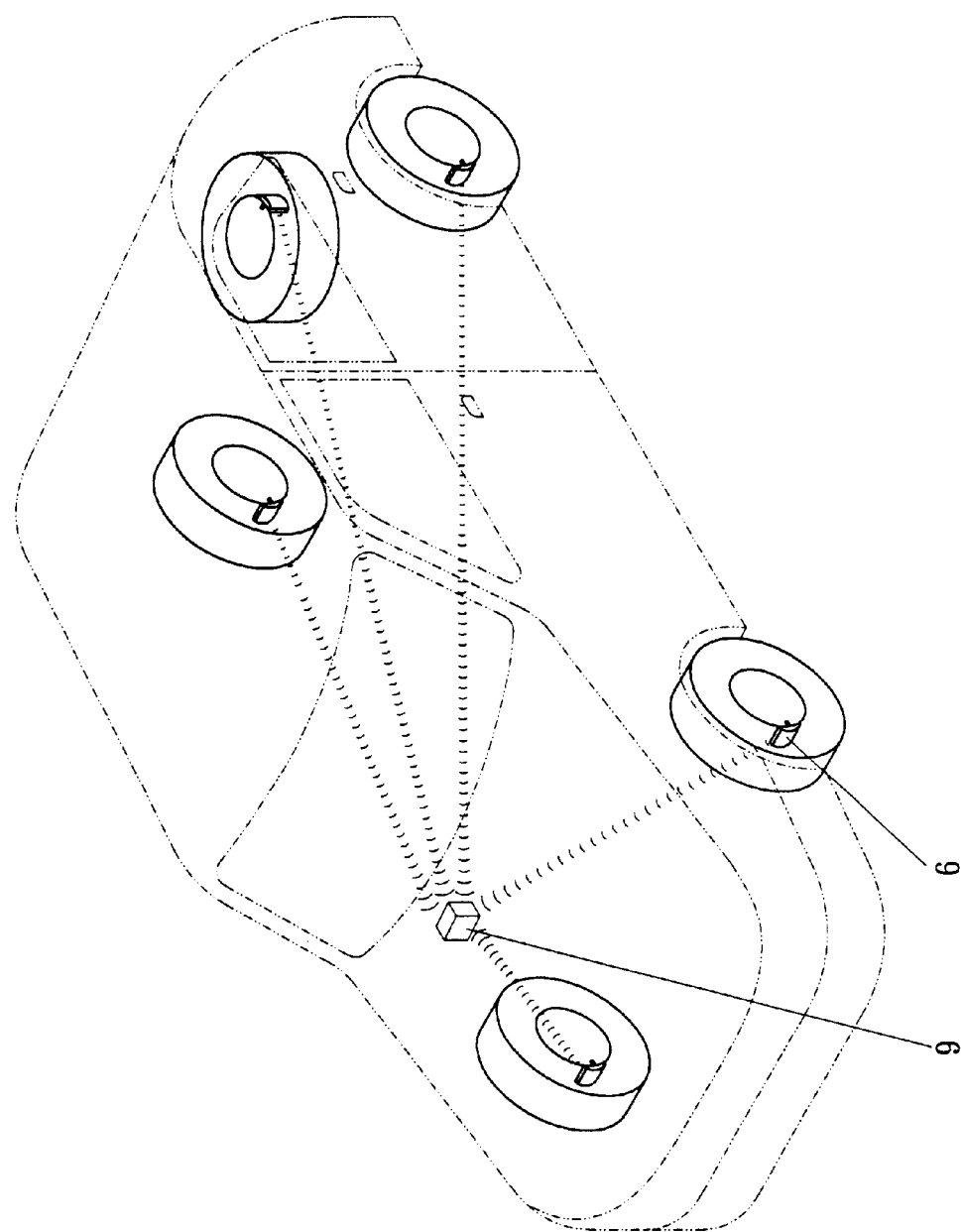
FIG. 7 shows the example that the pressure sensor of the invention is applied in the automobile tire.

Refer now to FIG. 7. In the present invention, the pressure sensors (2) and receiver parts (9) and (6) are installed in all four wheels and the fifth wheel, by which the driver can always know the pressure condition of each tire and, if necessary, can always refill the air to the tires in time.;

While the present invention has been particularly shown and described with reference to a preferred embodiment, it will be understood by those skilled in the art that various changes in form and detail may be without departing from the spirit and scope of the present invention.

What is claimed is:

1. A pressure sensor, for use in a cavity to monitor pressure in the cavity, said pressure sensor comprising:

a shell;

a first air chamber, located at a bottom of the shell, further having thereof an air-tight chamber, the air-tight chamber having a spring installed at a center thereof and covered by a button from a top end thereof;

a pressure member, located at a top of the button, having a bottom surface adhesive to the top end of the first air chamber through a round air-tight cushion; and a base plate, facilitated to a top of the shell for forming a second air chamber therebetween with the pressure membrane, having a shaft fixed at a center thereof and protruding therefrom into the second air chamber, and having air holes to air-communicate with the pressure container; the shaft having thereof a movable protrudent shaft for contacting with the pressure membrane, and further having thereof a top with both sides facilitated with respective electric conductive points linked with respective electrodes on the base plate.

* * * * *